United States Patent [19]

Wolter

[11] Patent Number: 5,039,007
[45] Date of Patent: Aug. 13, 1991

[54] WATER AND AIR HEATING SYSTEM

[76] Inventor: Gerald C. Wolter, Brighton Bank Bldg., 1100 Harrison Ave., Cincinnati, Ohio 45214

[21] Appl. No.: 358,627

[22] Filed: May 26, 1989

[51] Int. Cl.⁵ .............................................. G05D 23/12
[52] U.S. Cl. ................................... 236/12.1; 237/19; 126/19.5; 236/25 A
[58] Field of Search .............. 237/19, 8 R; 236/25 R, 236/25 A, 12.1, 12.11, 12.13; 126/19.5

[56] References Cited

U.S. PATENT DOCUMENTS

| | | | |
|---|---|---|---|
| 2,840,101 | 6/1958 | Saylor | 126/19.5 X |
| 4,627,416 | 12/1986 | Ito et al. | 236/25 A |
| 4,819,587 | 4/1989 | Tsutsui et al. | 237/19 X |
| 4,848,655 | 7/1989 | Woodin et al. | 237/19 |

Primary Examiner—Henry A. Bennett
Attorney, Agent, or Firm—Killworth, Gottman, Hagan & Schaeff

[57] ABSTRACT

A heating system in which water is heated by means of a gas heater or the like in which the heated water can be used for washing and the like or for making hot drinks such as coffee and the like, and in which the heated water can also be used to heat air in a heat exchanger to provide heated air for space heating.

14 Claims, 4 Drawing Sheets

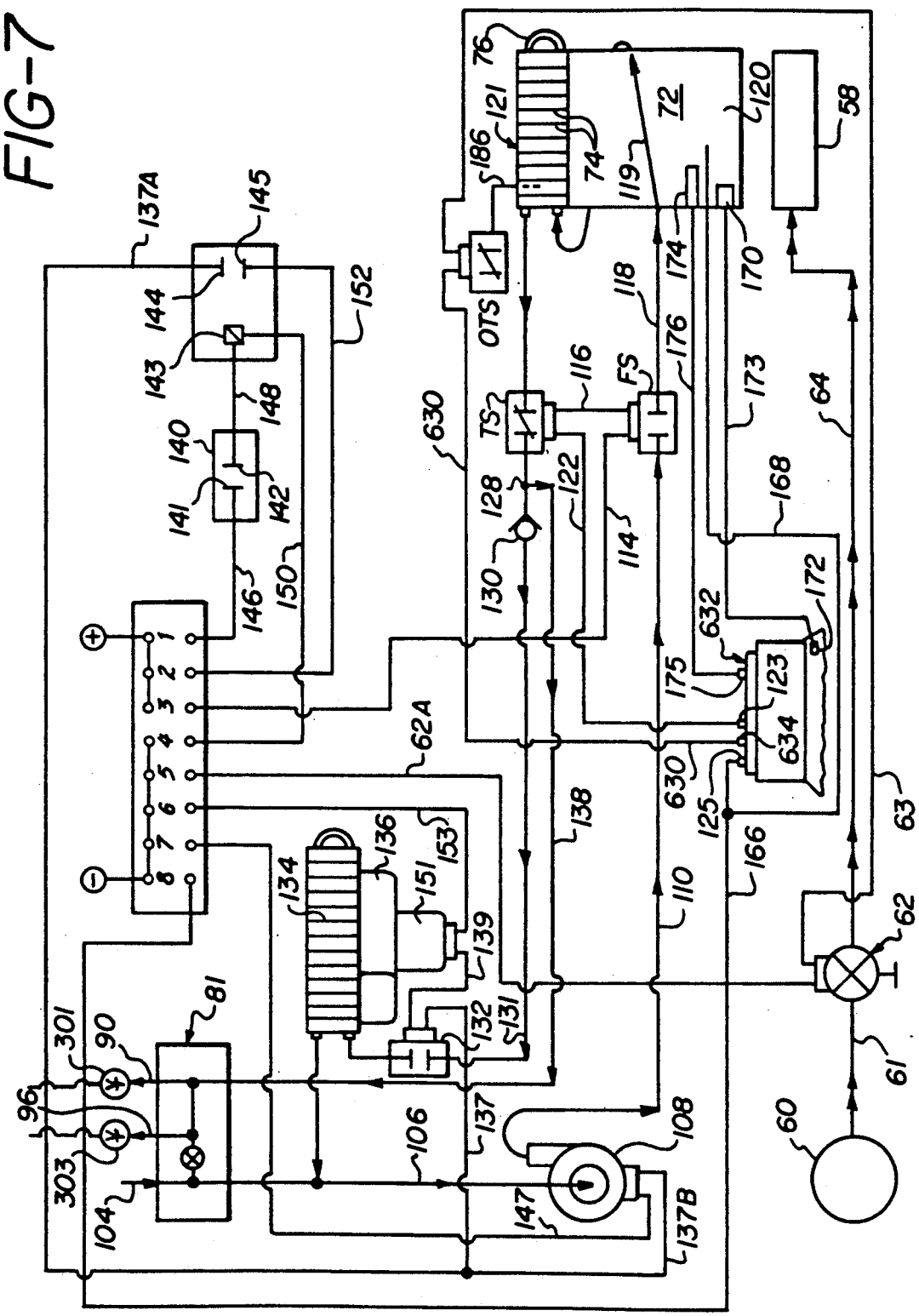

WATER AND AIR HEATING SYSTEM

BACKGROUND OF THE INVENTION

This invention relates to a heating system. More particularly, this invention relates to a plural heating system which supplies heated water and heated air.

An object of this invention is to provide a system which supplies heated water for various uses and heated air for space heating.

In both land based and water based recreational vehicles and like habitable structures where space is usually at a premium, it has been the general practice to provide each with a liquid or gaseous hydrocarbon fueled hot air space heating unit having a heating capacity of the order of 15,000 to 30,000 B.T.U. per hour output and of compact size, and, a similarly fueled "tank type" hot water heating unit having approximately five gallons storage capacity and a heating capacity of the order of 8,000 B.T.U. per hour and six to seven gallons per hour output with 100° F. temperature rise above ambient temperature. The space heating unit and the water heating unit each respectively occupy substantially an equal volume of space in the vehicle.

The low capacity of the water heating unit places substantial limits on bathing and other hot water usage.

A further object of this invention is to provide a plural heating system which can supply heated water at two different temperatures, one for general washing use and another for making hot drinks and the like.

A further object of this invention is to provide a plural purpose single heating system having greater heating capacity for both space and water heating, viz., as much as 60,000 B.T.U. per hour heating capacity, which will supply heated air for space heating purposes, heated water at a desired temperature for use in washing or other normal hot water uses and also heated water at near to boiling temperature for use in making instant coffee or other hot drinks, and which system will occupy a space volume in the vehicle of the order of a usual current 30,000 B.T.U. heating system or a usual 8,000 B.T.U., six to seven gallons per hour current hot water system, and thus will require approximately half the space in the vehicle for the accomplishment of both space heating provided heretofore, and as much as 54 gallons per hour of water at 100° F. above ambient temperature, and additionally the near boiling water for preparation of hot drinks, while combustion products discharged from the system at or below a temperature such as 325° F.

BRIEF DESCRIPTION OF THE INVENTION

Briefly, this invention provides a heating system in which water is heated by means of a gas heater or the like, and from which the water can be used directly for making coffee and other hot drinks and the like, or in which it can be blended with tap supply water for washing and the like, and in which the heated water can be used to heat air in a heat exchanger to provide heated air for space heating.

The above and other objects and features of the invention will be apparent to those skilled in the art to which this invention pertains from the following detailed description and the drawings, in which:

BRIEF DESCRIPTION OF THE DRAWINGS

FIG. 7 is a schematic view of the system, gas lines being shown with double arrow markings, water lines being shown with single arrow markings, and electric lines being shown by unmarked lines.

In the following detailed description and the drawings, like reference characters indicate like parts.

DESCRIPTION OF PRESENTLY PREFERRED EMBODIMENT

Figure 1:
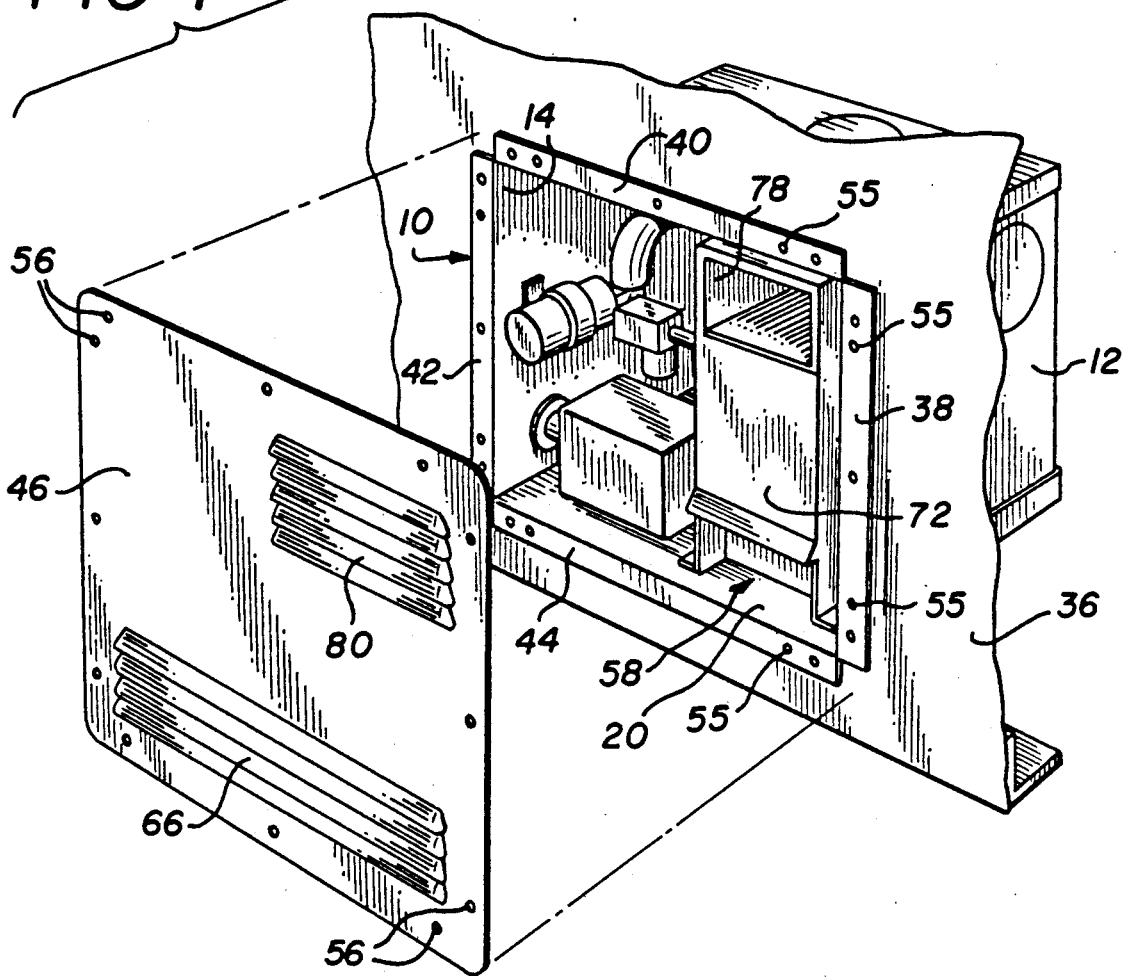
FIG. 1 is an exploded perspective view of a heating system constructed in accordance with an embodiment of this invention, a fragmentary portion of a wall of a recreational vehicle being shown in association therewith.
Figure 2:
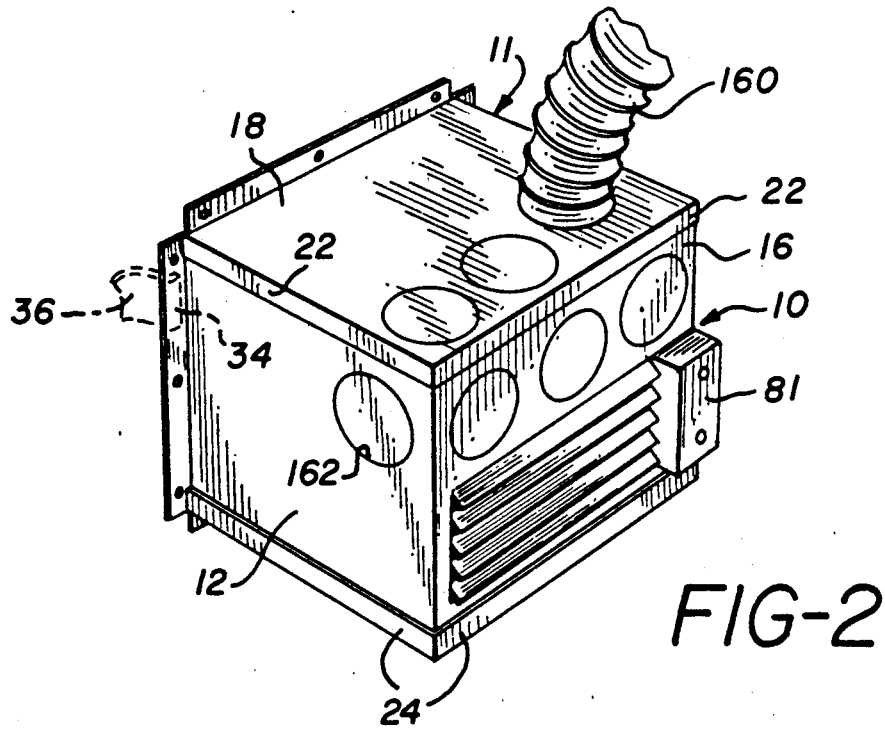
FIG. 2 is a perspective view of an outer part of the heating system.
Figure 3:
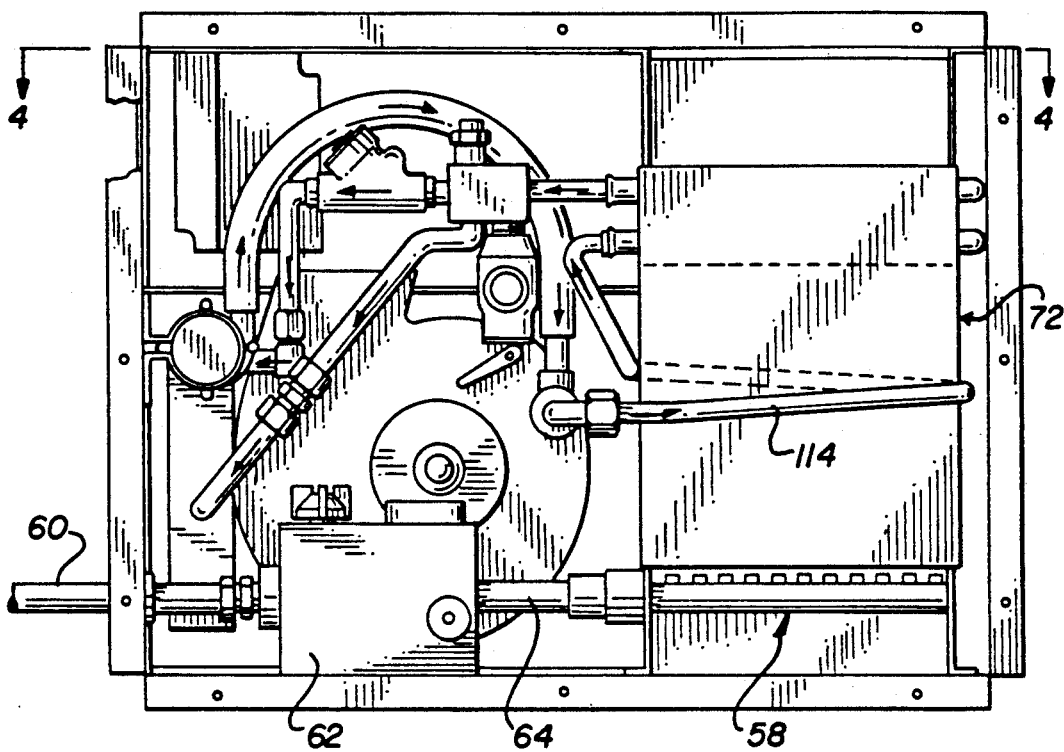
FIG. 3 is a view in side elevation of the heating system.

In FIGS. 1 and 2 is shown a plural heating unit 10 constructed in accordance with an embodiment of this invention. The plural heating unit 10 includes an outer casing 11 having side panels 12, 14, back panel 16, top panel 18, and bottom panel 20. Flanges 22 (only two of which are shown) at edges of the top panel 18 overlie and are attached to upper edge portions of the side panels 12, 14 and back panel 16. Flanges 24 (only two of which are shown) at edges of the bottom panel 20 overlie and are attached to lower edge portions of the side panels 12, 14 and back panel 16. The outer casing 11 extends through an opening 34 (only a portion of which is shown om FIG. 2) in a side panel 36 of a recreation vehicle or the like, only a fragmentary portion of which panel is shown. Flanges 38, 40, 42 and 44 on the panels 12, 18, 16 and 20, respectively, engage the vehicle side panel 36, and openings 55 are provided therein for fasteners (not shown) for mounting casing 11 in opening 34 in side panel 36 of the vehicle. A closure plate 46 spans the flanges 38, 40, 42 and 44. Openings 56 in the closure plate 46 receive fasteners (not shown) to hold the closure plate 46 in assembled relation to the outer casing 11.

A gas burner 58 is mounted in the casing 11 to provide heat. Gas fuel, such as propane, from a container 60 (FIG. 7) passes through a line 61, and through an electrically operated valve assembly 62 and a line 64 to the burner 58. In FIG. 7, gas lines are indicated by lines with double arrow heads, water lines are indicated by lines having single arrow heads, and electric lines are indicated by lines that have no arrow heads. Electricity is supplied to the main terminals of positive terminal pairs 1, 2 and 3, and the main terminals of negative terminal pairs 4, 5, 6, 7 and 8. One side of the electrically operated valve assembly 62 is connected to the negative branch terminal 5 by a lead 62A. The other side of the electrically operated valve assembly 62 is connected by a lead 63 to an over-temperature switch OTS which is normally closed, but open when the temperature of gases about to discharge from inside furnace 72 is excessive. When the temperature in the furnace 72 is satisfactory (below the upper limit temperature), switch OTS is closed and the lead 63 is connected to a lead 630. The lead 630 is connected to a terminal 634 of a control and timing module 632. The control and timing module can be a standard model control and timing module for a gas furnace, such as the product known as Gasliter Mark 10, a trademark of Channel Products Inc. of Chesterland, Ohio, or other suitable furnace control and timing module.

Figure 4:
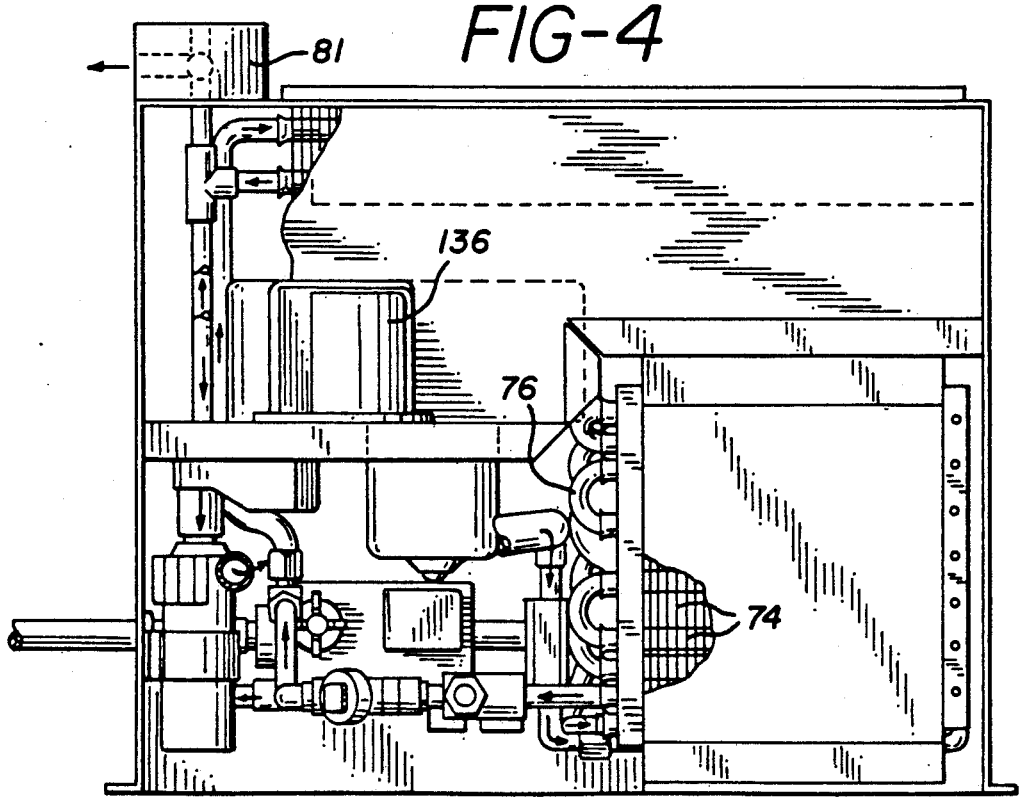
FIG. 4 is a top plan view of the heating system, parts being broken away for clarity.
Figure 6:
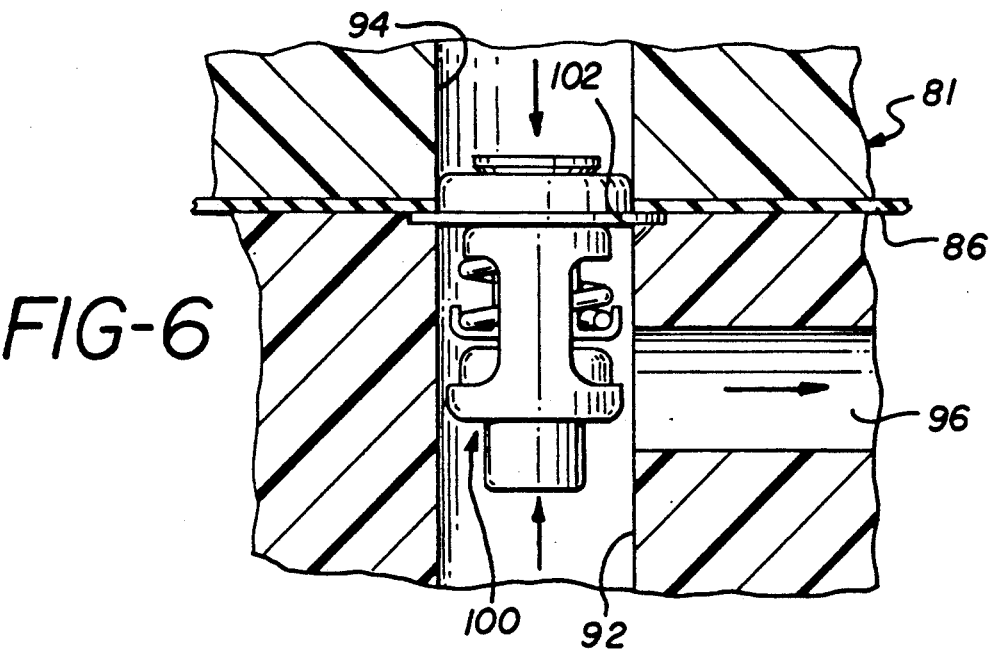
FIG. 6 is a view in upright section of the mixing valve assembly.
Figure 5:
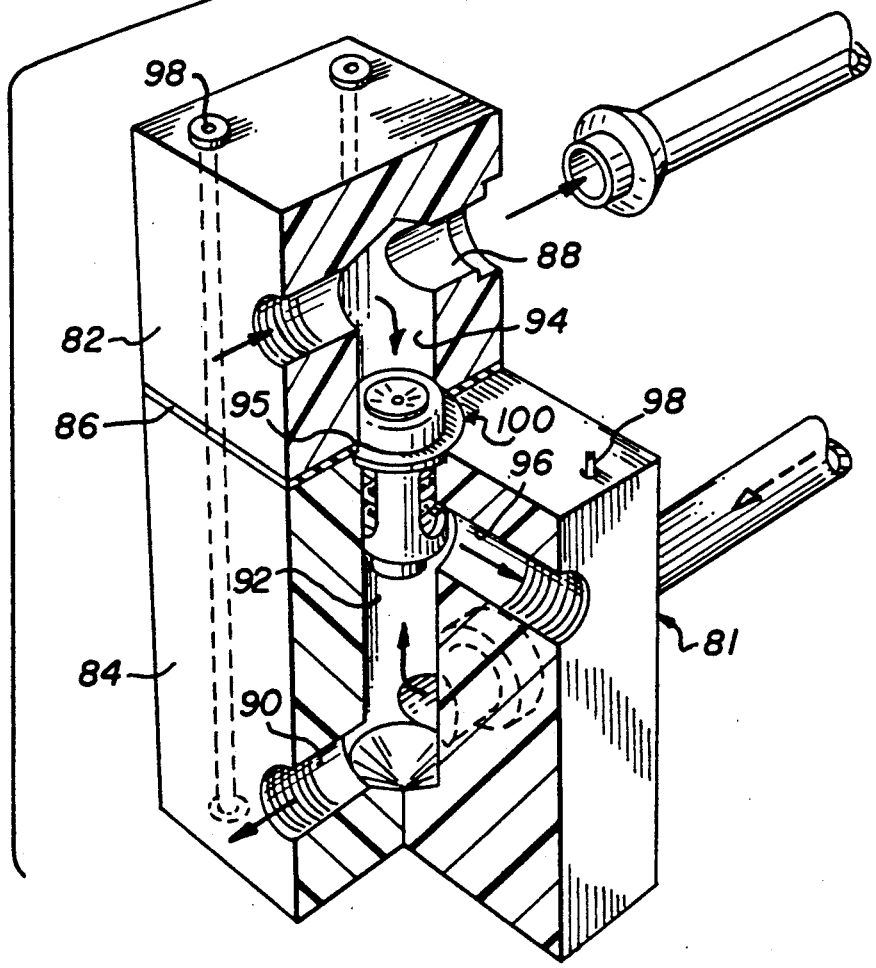
FIG. 5 is a perspective partly exploded view partly broken away and in section of a mixing valve assembly of the system.

Air for combustion enters the outer casing 11 through louvers 66 in the closure plate 46. The combustion air and gas burn in furnace 72 and pass between and around fins 74 (FIG. 4) mounted on a water carrying tube 76. A plenum chamber 78 (only a portion of which is shown) receives products of combustion and directs the products of combustion through louvers 80 in the closure plate 46 to be discharged.

Water enters and can leave the system through a water fitting assembly 81 (FIGS. 2, 4, 5 and 6). The water fitting assembly 81 includes a cold water block 82, a hot water block 84, and a gasket 86 between the blocks 82 and 84. A cold water bore 88 extends transversely of the cold water block 82. A hot water bore 90 extends transversely of the hot water block 84. Aligned upright openings 92 and 94 are formed in the blocks 84 and 82, respectively. An opening 95 is formed in the gasket 86. The openings 92, 94 and 95 connect the cold water bore 88 with the hot water bore 90. A transverse opening 96 in the block 84 extends outwardly from the aligned upright passage formed by openings 92, 94 and 95. Fasteners 98, only three of which are shown, hold the blocks 82 and 84 and the gasket 86 in assembled relation.

A thermostatic valve assembly 100 (not shown in detail) is disposed in the aligned openings 92 and 94 and controls flow of water therein. The thermostatic valve assembly 100 can be a standard thermostatic valve assembly, such as a CALTHERM V 1165, a trademark of Caltherm Corp. of Columbus, Ind. A flange 102 of the valve assembly 100 engages the gasket 86. When the system is operating in a water heating mode, water at just under the boiling point of water passes along the hot water bore 90. Water from supply main 104 at or below room temperature passes along the cold water bore 88. The thermostatic valve assembly 100 causes mixing of water from these bores to provide temperate water at a temperature which can be approximately 140° F. in the transverse opening 96.

When the unit is in the water heating mode, a first faucet means 301 connected to the hot water bore 90, or a second faucet means 303 connected to the temperate water line 96, can be opened to permit cold water under pressure from a cold water line 104 to flow into the system. From the line 104, the water passes through bore 88 and along a water line 106 to a water pump 108. The water pump 108 permits the cold water to flow therethrough under mains supply pressure in the water heating mode. From the water pump 108, the cold water flows through a line 110 to a flow sensing switch FS. When the flow sensing switch FS senses a sufficient flow of water, as for example two quarts per minute, the flow sensing switch FS provides a connection between electric leads 114 and 116. The lead 114 is connected to the positive power branch terminal 3. The lead 116 is connected to one side of a thermal switch TS. From the flow sensing switch FS, the water flows through a line 118 to the furnace 72. A section 119 of the line 118 is attached to a wall 120 of the furnace 72 to serve as a preheater for the water and to lower the furnace wall temperature. From the preheater section 119, the water passes through a fin tube heat exchanger 121 in the furnace and to the thermal switch TS. The thermal switch TS can serve to disconnect the lead 116 from a lead 122 when the temperature of water in the switch TS exceeds a suitable temperature for operation in the water heating mode, such as 190° F. The lead 122 is connected to a terminal 123 of the timing and control module 632. When the system is in the water heating mode, the water passes through a T-fitting 128 and along a line 138 to the hot water bore 90 and out the water line 96 or the bore 90, whichever has an open faucet.

When the system is in the space heating mode, water from the T-fitting 128 passes through a check valve 130, a line 131 and a thermal switch 132 to a heat exchanger 134. The thermal switch 132 serves to connect leads 137 and 139 when the temperature of the water passing through the thermal switch 132 is sufficiently high that air driven through the heat exchanger 134 by a fan 136 is warm enough for comfort, as when the water temperature is at least 110° F. The lead 137 is connected to branch leads 137A and 137B. Operation of the fan 136 is controlled by a thermostat 140 having contacts 141-142, a coil 143, and coil operated contacts 144-145. The thermostat 140 can be placed in an appropriate position in living quarters of the recreation vehicle. When the temperature at the thermostat falls to a temperature indicating heat is required, the thermostat contacts 141-142 close to cause connection between leads 146 and 148. The lead 146 is connected to the positive power lead 1. The lead 148 is connected to one side of the coil 143. The other side of the coil 143 is connected to a lead 150. The lead 150 is also connected to the negative power lead 4 so that the coil 143 is energized. Energizing of the coil 143 causes closing of the coil operated contacts 144-145. One side of the contacts 144-145 is connected by way of a lead 152 to the positive power lead 2. The other side of the coil operated contacts 144-145 is connected to the branch lead 137A. The branch lead 137B is connected to one side of the motor of the pump 108 and through lead 137, the thermal switch 132 and the lead 139 to one side of a motor 151 of the fan 136. The other side of the pump motor is connected by a lead 147 to the negative power lead 7, and the other side of the motor 151 of the fan 136 is connected through a lead 153 to the negative power lead 6 so that, when the thermostat 140 calls for heat and the contacts of the thermal switch 132 are closed, both the pump 108 and the fan 136 operate.

The fan 136 drives air through the heat exchanger 134 so that the air is heated. The heated air is discharged through ducts, one of which is shown in FIG. 2 at 160. The ducts can be attached to selected ones of openings 162 in the side panels 12, 14 and 16 and the top panel 18.

When the system is in the hot water producing mode, the system is set in operation by opening of either the faucet 301 or the faucet 303. When one of the faucets 301 and 303 is open, water from the cold water line 104 can enter the system. The cold water flows through the line 106, the pump 108, the line 110, and the flow sensing switch FS at a sufficient speed to cause flow sensing switch contacts of the leads 114 and 116 to engage to complete a circuit from the positive power lead 3 through the lead 114, the lead 116, the thermal switch TS, and the lead 122 to positively energize a terminal 123 of the control and timing module 632. A terminal 125 of the module 632 is negatively energized by the power lead 8 and the lead 166.

A branch lead 168 of the lead 166 is attached to the wall 120 of the furnace 72 to negatively energize or ground the wall 120. An electrode 170 is supported on the furnace wall 120 and is connected to a terminal 172 of the module 632 by a high tension line 173. A flame probe 174 is mounted on the furnace wall 120 and can be connected to a terminal 175 of the module 632 by a line 176. When the terminal 123 is positively energized, mechanism and components in the module 632 (not shown in detail) cause energizing of the terminal 634 and the leads 630 and 63 to cause activation of the gas valve assembly 62 to cause opening of the gas valve assembly 62 and to cause energizing of the terminal 172 to cause initiation of the electrode 170 to light the gas. When the gas is lighted, the flame probe 174 is activated by the flame of the burning gas. The module controls energizing of the electrode 170 so that if after a predetermined time the probe does not sense flame, the power to the electrode 170 is shut off by module 632. However, while the flame probe 174 senses flame, the module 632 can permit the flow of gas to continue. While electrode 170 and probe 174 are shown as separate units, control and timing modules are available with which a single composite unit which functions both as ignition electrode and flame probe is used, and such may be substituted for the module, electrode and probe shown and described.

When the faucets 301 and 303 are both closed, the flow of water is stopped, and the flow sensing valve FS releases the contacts thereof to permit separation of the contacts to deenergize the lead 116, the lead 122, and the terminal 123 of the module 632. The module 632 causes deenergizing of the lead 630 and the lead 63 to release the gas valve assembly 62 to close and shut off flow of gas. When the flow of gas stops, the flame goes out and the flame probe 174 is no longer in a flame.

When the system is in the space heating mode, the system is set in operation by the thermostat 140. When space heating is required, the thermostat contacts 141 and 142 engage to connect the positive power lead 1 through the leads 146 and 148 to one side of the coil 143. The other side of the coil 143 is connected to the negative power lead 4 so that the coil 143 is energized to cause engagement of the contacts 144 and 145 and to cause connection of the positive power lead 2 through the lead 152 to the branch lead 137A, the lead 137, and the branch lead 137B. Energizing of the branch lead 137B causes operation of the water pump 108 to drive water from the water pump 108 through the line 110, the flow switch FS, the line 118, the line section 119, the heat exchanger 121, the thermal switch TS, the T-fitting 128, the check valve 130, the line 131, the thermal switch 132, the heat exchanger 134, and the lead 106 to return to the water pump 108. The flow of water through the flow switch FS causes ignition as already explained. When the temperature of the water is sufficiently high, the thermal switch 132 is actuated to connect the leads 137 and 139 to energize the motor of the fan 136 to cause flow of air through the heat exchanger 134 to heat the air as the air is driven out the duct 160. When the temperature of air at the thermostat 140 is sufficiently high, the contacts 141-142 and the contacts 144-145 open to deenergize the lead 137 and the branch leads 137A and 137B to stop the water pump 108 and the fan 136. When the flow of water through the flow switch FS stops, the terminal 123 is deenergized to cause the module 632 to deenergize the terminal 630 to shut off the power to the gas valve assembly 62 to shut off the gas flow to the furnace 72.

An overheat switch OTS is connected between the leads 630 and 63. A sensor 186 of the overheat switch OTS is located in an upper end portion of the furnace 72. If sensor 186 senses combustion product temperature that exceeds a selected value, such as 325° F., the contacts of the overheat switch OTS open to deenergize the lead 63 and the gas valve assembly causing shut-off of the burner 58.

The heating system described above and illustrated in the drawings is subject to structural modification without departing from the spirit and scope of the appended claims.

Having described my invention, what I claim as new and desire to secure by letters patent is:

1. A dual heating system for providing both heated water and space heat comprising in combination:
   a) means for providing a supply of heated water to a discharge point including, means for sensing demand for heated water; a source of water; means for heating said water including a burner, a source of fuel to said burner, and means to ignite said fuel in said burner; means for providing water from said source to said heating means to produce heated water, and means for supplying said heated water to said discharge point; and control means responsive to said means for sensing demand for heater water to activate said ignition means for said burner and supply fuel from said source; and
   b) means for providing space heating to an interior space including, a water to air heat exchanger for transferring heat from said heated water to an air supply; means for supplying heated water to said heat exchanger; means for directing air through said heat exchanger and into said interior space; a thermostat to activate said means for supplying heated water and said means for directing air in response to a demand for heated air in said interior space; means for sensing the temperature of said water in said heat exchanger; and means communicating with said sensing means to disable said means for directing air through said heat exchanger when the temperature of said water in said heat exchanger is below a selected temperature.

2. The dual heating system of claim 1 wherein said means to ignite said fuel in said burner comprises an electrode.

3. The dual heating system of claim 2 including means for sensing ignition of said fuel in said burner, in communication with said control means, for cutting off said fuel to said burner if ignition of said fuel does not occur.

4. The dual heating system of claim 3 including means located at said discharge point for supplying both near boiling point water and heated water at approximately 140° F., said means including a thermostatic valve and means communicating with said source of water, said thermostatic valve supplying near boiling point water upon demand and supplying heated water at approximately 140° F. upon demand by mixing said heated water at said discharge point with unheated water from said source of water.

5. The dual heating system of claim 1 including a furnace wall around said burner, said means for providing said water to said heating means including means directing said water initially along said furnace wall prior to exposure to said burner to preheat said water and lower the temperature of said furnace wall.

6. The dual heating system of claim 1 in which said control means include a solenoid valve which is actuated to supply fuel to said burner.

7. A compact dual heating system for providing both heated water and space heat to a recreational vehicle comprising in combination:
   a) means for providing a supply of heated water to a discharge point in said vehicle including, means for sensing demand for heated water; a source of water; means for heating said water including a burner, a source of fuel to said burner, and means to ignite said fuel in said burner; means for providing water from said source to said heating means to produce heated water, and means for supplying said heated water to said discharge point; and control means responsive to said means for sensing demand for heater water to activate said ignition means for said burner and supply fuel from said source;
   b) means for providing space heating to an interior space within said vehicle including, a water to air heat exchanger for transferring heat from said heated water to an air supply; means for supplying heated water to said heat exchanger; means for directing air through said heat exchanger and into said interior space; a thermostat to activate said means for supplying heated water and said means for directing air in response to a demand for heated air in said interior space; means for sensing the temperature of said water in said heat exchanger; and means communicating with said sensing means to disable said means for directing air through said heat exchanger when the temperature of said water in said heat exchanger is below a selected temperature; and
   c) means for mounting said dual heating system in said vehicle.

8. The compact dual heating system of claim 7 including means for supplying combustion air to said burner from outside of said vehicle.

9. The compact dual heating system of claim 7 including means for directing the products of combustion of said burner outside of said vehicle.

10. A water heater adapted to provide heated water to a recreational vehicle comprising:
   means for providing a supply of heated water to a discharge point in said vehicle including, means for sensing demand for heated water; a source of water; means for heating said water including a burner, a source of fuel to said burner, and means to ignite said fuel in said burner; means for providing water from said source to said heating means to produce heated water, and means for supplying said heated water to said discharge point; control means responsive to said means for sensing demand for heater water to activate said ignition means for said burner and supply fuel from said source; and means located at said discharge point for supplying near boiling point water and heated water at approximately 140° F., said means including a thermostatic valve and means communicating with said source of water, said thermostatic valve supplying near boiling point water upon demand and supplying heated water at approximately 140° F. upon demand by mixing said heated water at said discharge point with unheated water from said source of water.

11. The water heater of claim 10 wherein said means to ignite said fuel in said burner comprises an electrode.

12. The water heater of claim 11 including means for sensing ignition of said fuel in said burner in communication with said control means for cutting off said fuel to said burner if ignition of said fuel does not occur.

13. The water heater of claim 10 including a furnace wall around said burner, said means for providing said water to said heating means including means directing said water initially along said furnace wall prior to exposure to said burner to preheat said water and lower the temperature of said furnace wall.

14. The water heater of claim 10 in which said control means include a solenoid valve which is actuated to supply fuel to said burner.

* * * * *